April 29, 1930. W. L. MORRIS 1,756,657
GREASE FEEDER
Original Filed Aug. 7, 1916  3 Sheets-Sheet 2
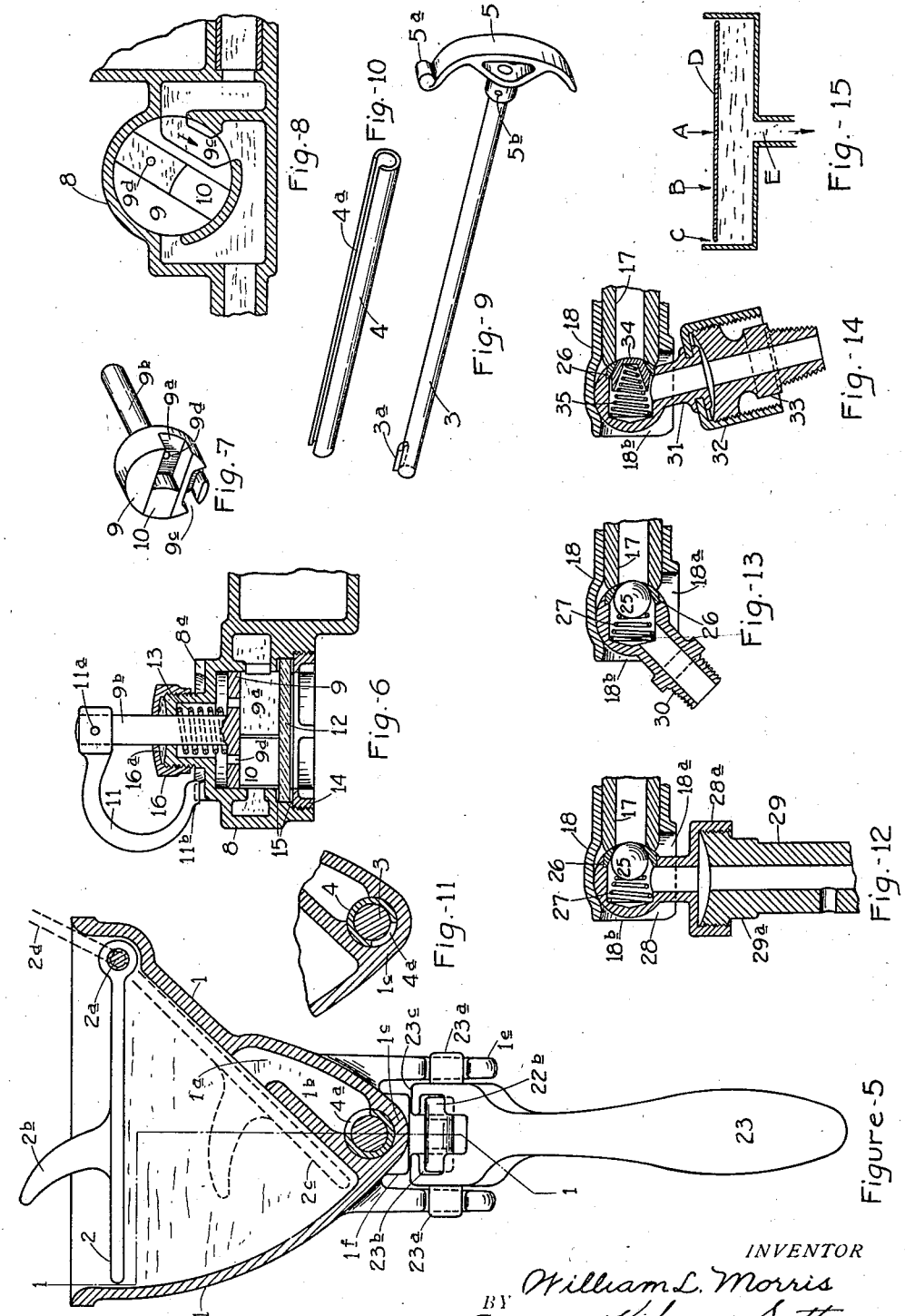
INVENTOR
William L. Morris
BY Cameron, Kerkam & Sutton
ATTORNEY April 29, 1930.  W. L. MORRIS  1,756,657
GREASE FEEDER
Original Filed Aug. 7, 1916  3 Sheets-Sheet 3
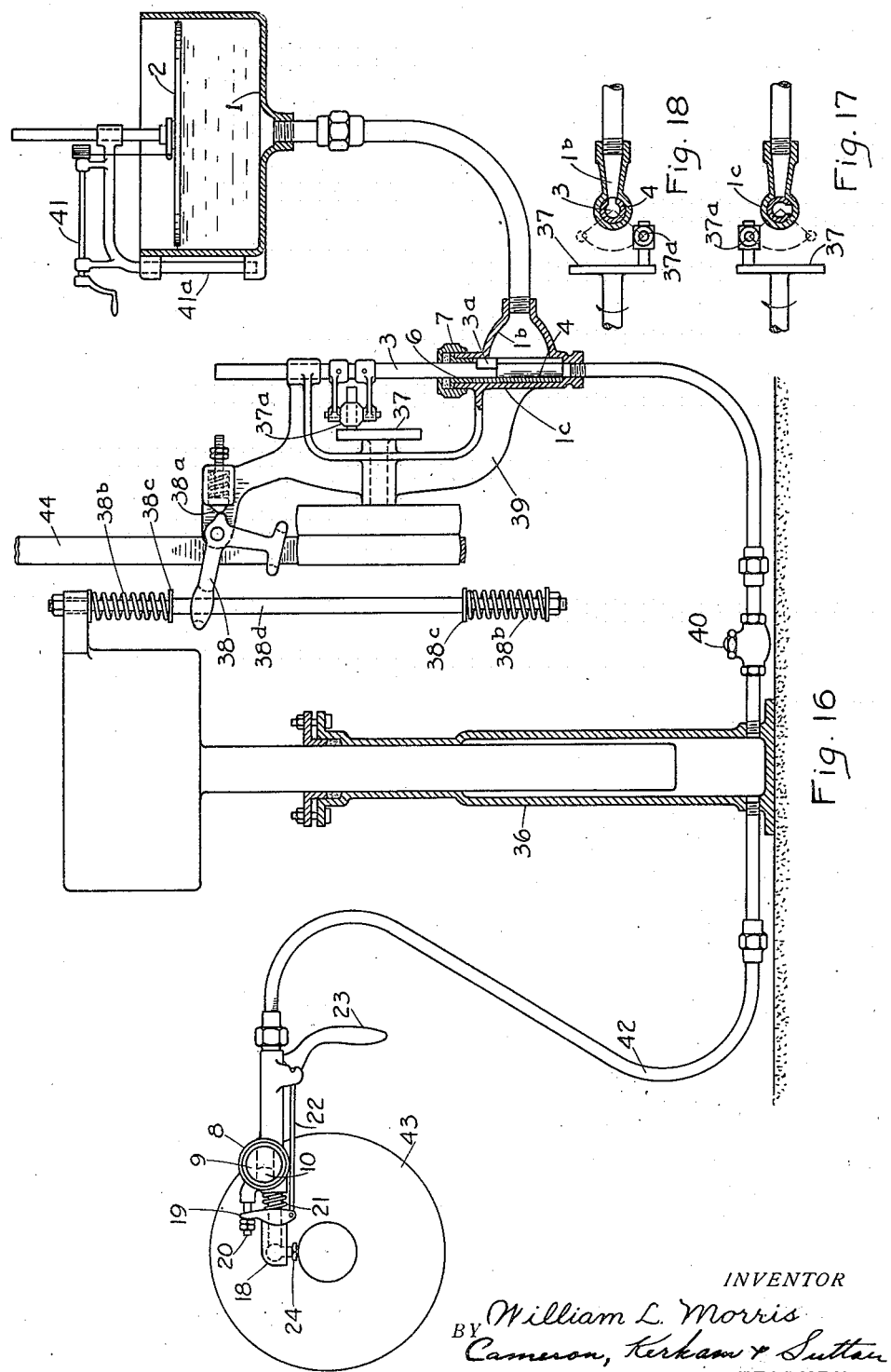
INVENTOR
William L. Morris
BY Cameron, Kerkam & Sutton
ATTORNEY Patented Apr. 29, 1930

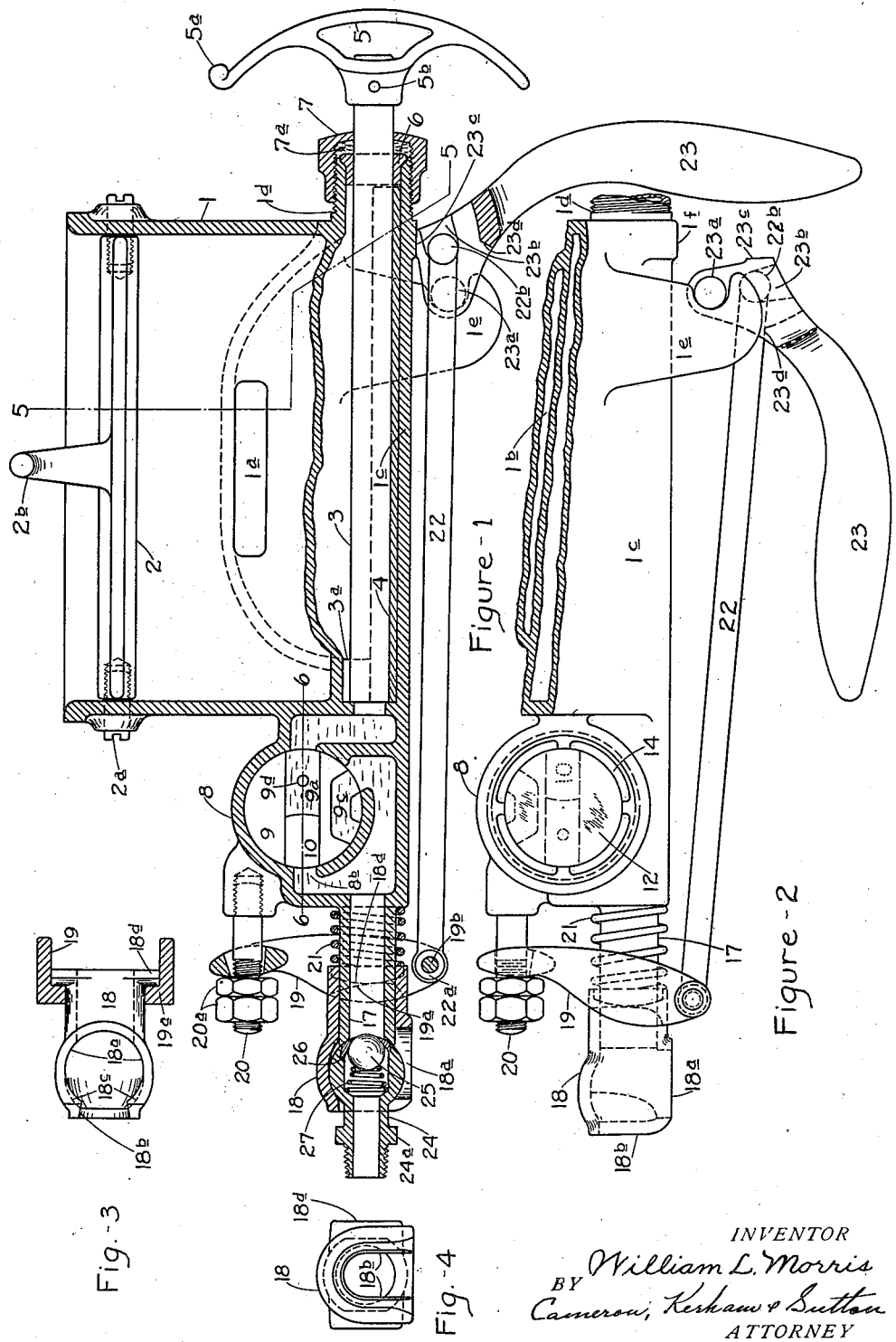

1,756,657

UNITED STATES PATENT OFFICE

WILLIAM L. MORRIS, OF CHICAGO, ILLINOIS, ASSIGNOR TO BENDIX AVIATION CORPORATION, OF NEW YORK, N. Y., A CORPORATION OF DELAWARE

GREASE FEEDER

Original application filed August 7, 1916, Serial No. 113,653. Divided and this application filed May 5, 1928. Serial No. 275,540.

This application is a division of my application Serial No. 113,653, filed August 7, 1916, for grease feeders.

This invention relates particularly to a grease feeder for filling the grease cups of an automobile, but, of course, it may have a more general application wherever it may be used. The principal object of the invention is to provide a grease feeder with which the grease cups or devices may be filled without any loss of grease and in the quickest possible time.

A successful grease feeder should be able to accomplish a number of important results; it should be of such construction that a central system could be employed feeding grease from a pipe line under pressure or a hand operated system, both of which can be easily and quickly attached and successfully used. A central system should be able to fill four or five grease cups a minute; a hand system should be able to fill two or three cups per minute. Either the hand or the pressure feed should be arranged to feed a predetermined amount at each feeding; the central system at about 200 pounds pressure, the hand system at about 50 to 75 pounds pressure, both systems having means of showing whether the grease has been fed. Any feeder should have such a construction that grease is prevented from oozing out when disconnected from the grease cup due to the air re-expanded, and there must be no pressure at the discharge connection when the grease feeder is detached. The connection to which the grease feeder is attached should permit of connection from any one of several angles on account of the many positions in which cups are placed on a car. The form of grease feeder should be such that an exact alignment of the feeder is not necessary in order to make the connection; the form of grease feeding connection should be one which will permit a considerable movement of the grease feeding device without imposing too great a strain on the small connections of the grease cups. The attachments for the grease cups should be uniform in size so that the feeder can readily be attached thereto regardless of the size or make of the grease cup itself. These are only a few of the requirements for a successful grease feeder and the present device is believed to answer all these requirements and many others as will hereinafter be set forth.

The invention consists in the features of novelty in the construction, combination, and arrangement of the several parts.

In the accompanying drawings, Figure 1 is a longitudinal section taken on the line 1—1 of Figure 5; Figure 2 is a view in elevation of the lower part of the construction shown on Figure 1; Figure 3 is a view looking at the under side of the movable clamp member; Figure 5 is a transverse section taken on the line 5—5 of Figure 1; Figure 6 is a plan section of the measuring device taken on the line 6—6 of Figure 1; Figure 7 is a perspective of the rotatable measuring member and its transversely movable plug; Figure 8 shows the measuring device of Figure 7 with its by-pass in communication; Figure 9 is a perspective of the hand plunger; Figure 10 is a perspective of a rotatable sleeve valve; Figure 11 is a cross sectional view through the plunger and sleeve when the grease port is shut off; Figure 12 shows one grease plug attachment; Figures 13 and 14 show other forms of grease plug attachments at different angles; Figure 15 is a diagrammatic view illustrating grease handling by suction; and Figures 16, 17 and 18 are views showing a power grease feeder.

This device is intended to store a quantity of grease and then deliver it in small quantities to different bearings or grease cups, and instead of the grease storage being in each of the several grease cups which must be screwed down to feed the grease, the storage is in the feeder. Also instead of feeding grease from the grease cups by manipulating them and refilling them when empty, this device is attached directly to the bearing to be supplied with grease and the grease is fed from it, the grease feeder being refilled instead of the cups. It is impossible to feed grease slowly and automatically for a considerable time, particularly with a device like the ordinary grease cup and it is for such bearings as require only a small amount of grease that this device is particularly suited. Grease cups become fouled with dirt and impurities so that they are difficult to manipulate and when there are many cups there is much labor involved in adjusting and filling them. Another purpose of this device is further to save labor, but it will also save grease and avoid admitting much of the dirt and impurities that get into separate grease cups. This feeder can be quickly attached, the grease forced to the bearing, and the feeder detached. The various details employed are chiefly for the purpose of saving labor.

This feeder comprises its attaching device, a grease feeding mechanism, a quantity measuring mechanism, and the grease storage and suction feeding mechanism. In some cases the entire combination of devices is necessary, while in some other cases a power pump may be used to supply grease under pressure in connection with the attaching and measuring mechanisms.

Grease is a peculiar substance to handle and until its characteristics are pointed out the new and novel details employed in this device will not be sufficiently appreciated. Grease being a solid or rather a semi-solid, more or less plastic, will not flow unless it is forced by pressure. If suction is applied to a chamber or receptacle containing grease, air will pass through the grease where there is the least resistance. If air is prevented from entering at the point of least resistance then the suction will be greatest at this point and by increasing the length of travel that the air would have to take, the greater will be the suction at points of least resistance which are covered to actually prevent air from entering. This can be more clearly shown by referring to Figure 15 in which the disk D is forced down on the grease in a suitable receptacle to exclude air from the mass of grease so that the pressure per unit of area at the point A would, when suction is applied to the outlet E, be much greater than necessary to move the grease, gradually becoming less at the point B and the lowest possible pressure at the edge of the disk C; really less than that required to move the grease. Stating this a different way, it is the combined pressure on the entire disk D caused by the suction that is sufficient to withdraw the grease, but the pressure at the edge of the disk is too low for air to pierce thru the body of the grease. Thus, although the grease may be almost entirely removed from such a receptacle by suction, the length of travel of the air thru the grease would be so great that more pressure would be required to puncture thru the grease than to withdraw it from the suction opening.

Another consideration in handling grease is the difficulty of keeping air out of the grease container; such air as would be encircled or pocketed by grease while placing it in the container. When air and grease are confined together the measuring device will not measure accurately; furthermore, the pockets of air re-expand when suction or pressure are alternated, and when detaching the feeder from the bearing the compressed air may eject grease at the connecting fittings. The shallower the container and the larger its filling opening, the less air will be pocketed while filling the container with grease. It is further desirable to employ the form shown to serve this valuable purpose for the form of the container makes it possible to insert or fill it with grease without pocketing air, the form and shape of the lid or cover making it practicable to suck grease from the container without air piercing thru the grease. This device also relieves pressure on the grease at the point of connection before disconnecting therefrom.

In feeding grease to different bearings some will require much pressure to force it into the bearings while others will require very little pressure. When only a small amount of grease is to be supplied no hand opening or closing of a valve or hand control of the amount of movement of the grease forcing ram can be relied upon to measure out a predetermined quantity of grease. It requires a device that will measure in cubical contents at any pressure or velocity, positively closing when the predetermined amount has been measured.

To prevent grease from escaping at the connecting members it is necessary to have a self closing valve so that any confined pressure in the bearing will not eject grease when the parts are separated, or when the joint is disconnected. The pressure at the grease feeder connection, that is, at the end of the feeder itself should first be below atmospheric pressure to prevent the grease from escaping from the open end of the feeder and the feeder should then be opened to the atmosphere before disconnecting it; this insures that the pressure is not above the atmosphere so it will discharge grease, and at the same time not enough below the atmospheric pressure to draw grease back into the feeder and allow air to enter which would have to be forced into the next bearing filled. It has been shown in practice that the feeder herein shown and described will do all of the above things and answer all of the requirements for a successful grease feeder.

In the accompanying drawings the numeral 1 designates generally the grease receptacle having the form shown in cross section in Figure 5 throughout its entire length as shown in Figure 1. This grease receptacle has an opening 1ª thru which grease is sucked from the receptacle, the sides of the opening being spaced from the points where air may enter approximately the same distance in all directions. The resistance against air leakage is made as near the maximum as possible for all points. From the opening 1ª a passage 1ᵇ extends which is the grease outlet to the cylindrical portion 1ᶜ of the receptacle casing. A lid or cover 2 is pivoted at one side of receptacle 1 on a pivot 2ᵃ and serves a far more valuable purpose than merely to keep dirt out of the grease receptacle and is pressed down firmly on the grease after the receptacle has been filled with it, thereby forcing the air and some grease outwardly around the edges and leaving the contents of the receptacle solid grease from which air has been excluded with the cover bearing firmly upon it. A handle 2ᵇ affords means for raising and lowering the cover which is shown on Figure 5 by the dotted outlines 2ᵈ in its raised position and by the dotted outline 2ᶜ in almost its lowest position.

Rotatable in a cylindrical portion 1ᶜ of the feeder casing is a valve sleeve 4 having a longitudinal slit 4ᵃ which extends its entire length. In this sleeve a ram or plunger 3 is movable which has at this end a block 3ᵃ adapted to fit in the slit 4ᵃ so that the outer radius of the block is the same as that of the sleeve. The plunger can therefore be moved longitudinally without moving the sleeve and when the plunger is rotated the sleeve rotates also. At the outer end of the plunger is a handle 5 flat at one end but having a distinguishing scroll 5ᵃ to designate the position of the port in the sleeve valve 4. This handle is secured to the plunger by a pin 5ᵇ. At the outer end of the plunger is a retainer gland 6 which is positioned close to the outer end of valve sleeve 4, allowing only enough clearance so that the sleeve will rotate. This gland is formed with a shoulder to prevent its being pressed in against sleeve 4 and a packing nut 7 with interposed packing 7ᵃ prevents leakage around the gland and retains the plunger and the sleeve 4 in place. In operation the plunger 3 can be withdrawn until the block 3ᵃ comes in contact with the gland 6. The boss 1ᵈ to which the gland and packing nut are attached is shown as an integral part of the receptacle 1. The bore at the discharge end of the cylinder is sufficiently smaller than the diameter of the valve sleeve 4 to provide a shoulder against which this end of the sleeve may rotate, and also form a stop against which the inner end of piston 3 may contact to limit its travel in this direction.

The case of the measuring device is designated generally by the numeral 8 and may be a separate and distinct part attached to the receptacle 1 instead of an integral part as shown in Figure 1. In this casing 8 is a circular bore in which a rotatable member 9 is movable. This member 9 has a slot 9ᵃ through which the grease passes to be measured, and a measuring block 10 slidable therein, the length of the block determining the amount of grease to be ejected with each half turn of the member 9. The stem 9ᵇ extends to the outside of the measuring device to permit movement thereof. To this stem a handle 11 is attached by means of a pin 11ᵃ, with a lower extremity 11ᵇ adapted to make contact with stops 8ᵃ projecting from the casing.

In front of the rotatable member 9 is a glass disk 12 against which the rotatable member 9 is pressed by means of a spring 13. The glass disk is held in place with a retaining ring 14 and made tight with packing rings 15. The stops 8ᵃ at the back of the measuring device are so placed that the lever 11 can be turned half way and back again to make the ends of the slot 9ᵃ register with openings in the casing 8 for discharging the grease. A packing nut 16 and packing 16ᵃ prevents leakage around the stem 9ᵇ. This measuring device has a by-pass 9ᶜ whereby the grease which passes through need not be measured. This by-pass port 9ᶜ can be turned to the position shown in Figure 8, thereby shutting off the port or slot 9ᵃ. In releasing the lower end 11ᵇ of the lever 11 from engagement with stops 8ᵃ, the rotatable member 9 is moved away from the glass disk 12, compressing the spring 13 and allowing the end 11ᵇ to ride on top of the stops 8ᵃ until the position shown in Figure 8 is reached. If this position is to be maintained for some time, the stops 8ᵃ would be notched at the by-pass position so that the rotatable member 9 will be locked in this position and allowed to return to its normal position against the glass 12. In the bottom of the slot 9ᵃ of this member 9 are holes 9ᵈ for relieving pressure between the rotatable member 9 and the casing 8 when the rotatable member is drawn back to disengage its handle from the stops.

When the floating piston or plug 10 is at one end of the slot 9ᵃ as shown by Figure 1, it closes a discharge passage 8ᵇ; the piston is larger than the passage and closes over it tightly, much the same as a check valve. In Figure 2 the rotatable member 9 is turned half way around with the piston or plug 10 in the same position in slot 9ᵃ, as it was in Figure 1 and ready to take its travel of a stroke and eject as much grease as lies between the piston and discharge passage 8ᵇ. The glass sight 12 shows clearly the position of the piston, at all times, and whether grease has traveled through the measuring port, and also shows if air is in the charge of grease. The quantity of grease discharged each stroke can be varied by varying the length of the floating piston 10.

At the discharge end of the measuring device casing is a nozzle 17 which has communication with the passage 8ᵇ and with the discharge from the by-pass 9ᶜ so that either a measured or unmeasured quantity of grease can be discharged therefrom. Slidable on this nozzle is a clamping member 18 which has an attaching extremity 18ᵃ open from below and a reduced opening 18ᵇ at the end shown by Figures 3 and 4. These openings are proportioned to receive a spherical end of a ball fitting 24 as shown by Figure 1, so that it can be clamped between the member 18 and the end of nozzle 17, a spherical bearing face 18ᶜ being formed in the clamping member as shown in Figure 3 and the end of the nozzle 17 having a spherical seat.

Extending from the clamping member 18 are ears 18ᵈ as shown in Figures 1, 3 and 4 by which the member is pulled up to the nozzle 17. A pull lever 19 has legs 19ᵃ which bear against the ears 18ᵈ, the lever being like an inverted U with the upper end loosely engaged by the stud 20 upon which are adjusting nuts 20ᵃ. The ears 18ᵈ (Figure 4) fit between the legs of the lever 19, which extend down over the nozzle 17 and are provided at the lower ends with holes through which a pin 19ᵇ extends. These ears 18ᵈ are straight sided and fit between the legs of the lever 19, thereby preventing the clamping member from rotating out of position. For nearly all connections, the clamping members 18, 19, 22 and 24 bear only on one side of their bearing and a spring 21 is therefore placed at the nozzle end of the clamping member tending to keep bearings in contact. These connections can be made with full bearings as 23ᵃ and would bear against the opposite sides of the different bearings dispensing with the spring, but this would not be as satisfactory as the construction shown.

A link or pull rod 22 has a long eye 22ᵃ at one end, through which the pin 19ᵇ extends, and the other end 22ᵇ is T-shaped, forming a bearing part at each side. An operating lever 23 is formed with a pivot leg 23ᵃ at each side, which has a bearing in recesses of legs 1ᵉ, preferably formed integrally with the bottom of receptacle 1. In this lever 23 are bearings 23ᵇ for the T-headed extremities 22ᵇ of link 22, so that the movement of the lever 23 carries the T-head past the line through the center of the eye 22ᵃ of the pull rod and the bearing 23ᵃ of the lever, until a shoulder 23ᶜ of the lever 23 abuts a stop or projection 1ᶠ on the bottom of the receptacle. The limit of travel in the other direction is determined by the engagement of a shoulder 23ᵈ of the lever with the pull rod 22, as clearly shown in Figures 1 and 2.

An end ported fitting 24 is clearly shown in Figure 1, having a threaded connecting end and a hexagonal portion 24ᵃ for attaching it. In the port is a ball valve 25 which is pressed against a valve seat 26 inserted at the end of the port by a spring 27. In Figures 12, 13, and 14 different forms of ball fitting are shown; the port of the ball or spherical fitting 28 is at the side and in Figure 12 the numeral 29 designates generally a pin or bearing for receiving lubricant, with a grease cup end 29ᵃ threaded into a fitting end 28ᵃ; in Figure 13, a member 30 is similar to the fitting shown in Figure 1 with the exception that the port is at 45 degrees. In Figure 14 the ball fitting 31 has a port at a special angle, and has its lower end headed over and around an opening in a standard grease cup cap 32, the stationary part of the grease cup being designated as 33. In this last construction is a formed valve 34 and a pointed spring 35 bearing inside of the valve.

These modified forms are shown as they can all be used with a clamping device, the spherical form being superior to others, as it allows connection from almost any angle, and is easily cleaned or wiped off. Furthermore a slight movement of the grease feeder is permissible with the spherical connection and without placing a strain on the fitting; the clamping member will slip on the ball up to a point such that it bears on the neck; the neck however would be considerably smaller than the opening 18ᵇ shown in Figure 4.

The operation of this device is as follows: the cover 2 is raised to the position 2ᵈ and with a small paddle or putty knife, grease is placed in one side of receptacle 1, and as more is added and squeezed down into the receptacle, it is filled from one end to the other. This method of filling expels the air. When the receptacle is full, the cover is forced down firmly, squeezing out the top air together with some grease. The surplus grease is cut away with the putty knife and put back into the grease pail or barrel and the feeder is ready to use after first taking a stroke with the plunger 3 and discharging grease back into the pail to see that the grease is filled in solidly. With a rag in right hand to wipe off outer end of attachments, and filler in left hand, the clamping member 18 is placed over a spherical connection and the clamp lever 23 is pulled up to its stop with the left hand. With the right hand the grease is drawn into the sleeve 4 by moving plunger 3 outwardly and with the scroll on handle 5ᵃ, standing up. At the end of the outward stroke the handle 5 is turned half way around with the scroll at bottom, which closes the longitudinal port 4ᵃ, and the plunger is moved in, forcing grease from the sleeve through the measuring device. To disconnect, the lever 23 is pushed back with the left hand and clamping member 18 is disengaged ready to fill the next bearing. If the measuring device is being used, then while going from one bearing to the next, the handle 11 is turned half way around against its other stop 8ᵃ. The grease will hold the cover 2 firmly by suction so it will not open even when placed upside down. When the receptacle is empty, the increased resistance will be noted when pulling out the plunger as the cover 2 would be at the end of its travel. Where much grease is to be handled, the plunger and receptacle would be stationary and much larger with flexible metallic hose run to the measuring and clamping device. The pump in this case would be power driven with a weighted accumulator arranged to cut out the pump drive when full and then throw it in when nearly empty, as shown by Figures 16, 17 and 18.

If a central service station system is used with a power pump to discharge the grease, the grease cups under the car, such as for brakes, rear axle swivel, universal joint, and the like, should point to such a position that a man in a cleaning pit beneath the car would find them easy of access. A piped pressure system for discharging grease requires a pump to create a pressure of about 200 pounds.

Grease cannot be readily placed in the small end of a long container, and when so placed, air is apt to be confined between each application of grease, while it is being pressed in. A shallow container with a large opening can be filled much more readily and air kept out entirely if grease is carefully placed so that a volume of air is not pocketed with the grease.

Where a certain movement, such as the travel of a ram determines the amount of grease fed, possibly no other device would be necessary. With either the hand or power form the measuring device should have a bypass to permit an unmeasured quantity of grease to be discharged.

That part of the feeding device which is connected to the grease receiving projection or fitting should be of such construction that it can be quickly attached and detached, preferably by lever manipulation, such as shown, rather than a screw, and when the lever is drawn up tight it should hold to the fitting even if the hand is removed, for in the manipulation of the grease feeding plunger with one hand, the other would be unsteady, releasing pressure at the connection and allowing a leakage. The clamping device should have a limit to its clamping and releasing travel to avoid unnecessary strain on the parts. A wear take-up is required so that if there is not sufficient tension it can be readily adjusted, and when so set will not shift out of adjustment. The attachments are accurately made to an established form with very small allowance for variation. The adjustment of the clamping device is used to take up the wear in the parts, not to cover inaccuracy or variations in the parts. The present invention fulfills all of these requirements.

Although the feeder nozzle is rigid, great flexibility in use is obtained by the variable angle of attachment which is made possible by locating the port holes at various angles on the grease receiving fittings. This flexibility is different and separate from that produced by a flexible conduit but it enables an operator to engage fittings and to avoid obstructions which would otherwise be difficult of access.

I claim:

1. The combination with a lubricant feeder, of a bearing for receiving the lubricant having a feeder connection member, the joining faces between the connection member and the feeder comprising a spherical joint face having a port within the face and a contact ring having a port within the ring, and means for holding these faces in contact through a range of varying angular positions with the port openings within the ring of contact.

2. The combination with means forming a lubricant bearing nipple, of a rigid supply means for the lubricant under pressure, non-flexible means connected with the lubricant supply means for engaging the nipple, the bearing nipple having ported attachment means disposed and pointing in any one of a plurality of different directions in addition to that in line with its axis so that the lubricant supply means may be applied thereto to clear an obstruction adjacent to the nipple without flexing the parts.

3. A grease feeder for detachable connection to a grease receiving bearing having a feeder projection comprising a slotted socket for making a detachable connection with feeder projections from a plurality of positions in different planes.

4. A lubricant feeder for a plurality of lubricant using bearings, each bearing having a projection with a port hole therein, and the port holes of different projections being located at various angles with the axis of the projection, comprising means for detachably and positively connecting the feeder to each of said projections so that the feeder will register with the port of said projection.

5. A grease feeder for a plurality of bearings having spherical lubricant receiving ported members with port openings at various angles with the axes of said members comprising a source of lubricant supply, means for holding the supply member in engagement with a ported member to which it is applied, the joint face between the supply and ported member being of a circular form to permit the location of port openings in the bearings at said different angles.

6. A lubricant feeder for detachable connection to a bearing or receiving lubricant having a round tip with a port opening therein in any one of a plurality of angles, and means for attaching the feeder to a round tip at an angle to communicate with the port thereof.

7. A grease feeder for a means for receiving grease having a ported spherical projection with a grease admitting port at any location on the sphere comprising a discharge nozzle and a connector movable on the nozzle having an extremity adapted to fit over a spherical projection to connect the port thereof with the discharge nozzle.

8. A lubricant feeder for a mechanism having a plurality of bearings each provided with a ported projection in which the aperture to the port is at different relative angular positions and in different planes and having a like contour of connecting faces at different port locations comprising a feeder nozzle, and means in connection with the feeder nozzle for universally connecting it with a ported projection in any one of the different positions to register with the apertures thereof.

9. A grease feeder for detachable connection to a port receiving device comprising means forming a spherical joint face adapted to be movably connected between the feeder and a receiving device to permit alteration in alignment of the feeder port in relation to a receiving device port, and mechanical means for holding the joint faces of the feeder in contact with the receiving device.

10. A lubricant feeder for detachable connection to a ported receiving device comprising a spherical joint face to permit relative angular movement, and means for holding the joint face in contact with a receiving device to permit relative movement but insuring a tight joint bearing on the spherical surface.

11. A lubricant feeding device for detachable connection to a lubricant receiver comprising means for applying pressure to a lubricant in the feeding device, and a detachable connection for engaging the feeding device, with the lubricant receiver comprising means for drawing the feeder up tightly against the receiver but permitting slidable movement at the joint face of the feeder with the receiver.

12. A grease feeding system for a mechanism having a plurality of bearings with apertured projections at different points thereof comprising a rigid feeder member having means for making universal connections to said apertures for clearing obstructions, means for detachably connecting the free end of said feeder member with said apertures, and means for supplying lubricant under pressure to the other end of said feeder member.

13. A lubricant feeder for detachable connection to a bearing having a ported feeder connection member comprising means forming a spherical joint face between the feeder and a connection member with a port within the joint face, and a contact ring having a port therein, and means for holding these faces in contact through a range of varying angular positions with respect to the port openings within the ring of contact.

14. The combination with a mechanism comprising a variety of bearings located at different points thereof, each bearing provided with an aperture for receiving lubricant, of means for supplying lubricant to said apertures comprising a lubricant feeder having means for forming different angular connections to said apertures for clearing obstructions without requiring flexure of said feeder, means for successively attaching the free end of said feeder to said apertures, and means for supplying lubricant under pressure to the other end of said feeder.

15. The combination with a mechanism comprising a variety of bearings located at different points thereof and at different angles, each bearing being provided with an aperture for receiving lubricant, of means for supplying lubricant to said apertures comprising nipples mounted thereon having ports which open at a plurality of different angles to clear obstructions, a quick detachable universal clamping means for successively attaching one end of said lubricant supplying means with said nipples, and comprising means for sealing the connection between said lubricant supply means and said nipples against the escape of lubricant, and means attached to the other end of said lubricant supply means for supplying lubricant thereto under pressure.

16. The combination with a lubricant nipple for a bearing of a source of lubricant supply, means adapted to connect the source of lubricant to the nipple, said nipple forming a universal joint with said connecting means and having a port arranged to register with the connecting means when the latter is applied thereto so that the connecting means may be free from flexure when coupled to said nipple in various angular relationships.

17. In combination a lubricant receiving member provided with a head having a bearing surface with a port therein, a lubricant supply member having a complementary bearing surface with a port adapted to register with the first port, a clamping member arranged to embrace said head, and manually controlled means for moving the clamping member with respect to the supply member to allow the application of the lubricant supply member to the receiving member and thereafter to positively clamp said members together.

18. In combination a lubricant receiving member provided with a head having a spherical bearing surface with a port therein, a lubricant supply member having a complementary bearing surface adapted to have universal movement with respect thereto and having a port adapted to register with the first port, a clamping member arranged to embrace said head, and manually controlled means for moving the clamping member with respect to the supply member to allow the application of the lubricant supply member to the receiving member and thereafter to positively clamp said members together while allowing universal motion therebetween.

WILLIAM L. MORRIS.